United States Patent [19]

Branchut et al.

[11] Patent Number: 5,630,678
[45] Date of Patent: *May 20, 1997

[54] APPARATUS FOR USE IN LAYING AN ELONGATED ARTICLE

[75] Inventors: Jean P. Branchut, Croix Chapeau; Ange Lupi, Marseilles, both of France

[73] Assignee: Stolt Comex Seaway AS, Stavanger, Norway

[*] Notice: The term of this patent shall not extend beyond the expiration date of Pat. No. 5,622,451.

[21] Appl. No.: 505,906

[22] Filed: Jul. 24, 1995

[30] Foreign Application Priority Data

Dec. 16, 1994 [NO] Norway ................................. 944895

[51] Int. Cl.⁶ ............................................. F16L 1/18
[52] U.S. Cl. .................... 405/166; 405/168.3; 405/168.4
[58] Field of Search ................................. 405/165, 166, 405/158, 168.3, 168.4, 169, 170

[56] References Cited

U.S. PATENT DOCUMENTS

| 3,581,506 | 6/1971 | Howard | 405/166 |
| 4,264,234 | 4/1981 | Pras | 405/168.1 X |
| 4,433,938 | 2/1984 | Boon | 405/168.1 X |
| 4,486,123 | 12/1984 | Koch et al. | 405/166 X |
| 5,348,423 | 9/1994 | Maloberti et al. | 405/166 |

*Primary Examiner*—William P. Neuder
*Attorney, Agent, or Firm*—Young & Thompson

[57] ABSTRACT

An apparatus for laying out a cable comprising a frame structure through which the cable is moved. The apparatus has a top side cable guiding means which is mounted for rotation about a vertical axis of the frame structure.

9 Claims, 3 Drawing Sheets

APPARATUS FOR USE IN LAYING AN ELONGATED ARTICLE

FIELD OF THE INVENTION

The present invention relates to an apparatus for use in laying an elongated flexible article, such as a cable or a pipeline from a vessel supported on a body of water including a vertical passage through the vessel and a frame structure supported above the vertical passage, guide means on said frame structure for guiding said elongated flexible article from above and down through the frame structure and the vertical passage, tensioner means supported in said frame structure for applying tension in said elongated flexible article, and means for holding said elongated flexible article when said tensioner means is not applying tension in said elongated flexible article.

BACKGROUND OF THE INVENTION

When laying a cable or a pipeline offshore the cable or pipeline may be spooled off a reel or drum and lowered into the water through the above disclosed apparatus. During the unwinding the elongated article will move bodily in a direction perpendicular to the unwinding or laying out direction of the elongated article as a consequence of the article being wound on the reel in a plurality of windings and in consecutive layers. This deviation from the laying line may be overcome by providing a substantial distance between the reel and the apparatus and/or by providing guide means for guiding the elongated article down into the apparatus.

SUMMARY OF THE INVENTION

According to the invention such guide means is mounted rotatable on said frame structure about a vertical axis through said vertical passage.

Such an arrangement enables the guide means to move in an arc following the deviation of the elongated article from the laying direction, thereby guiding the elongated article down in the apparatus. Advantageously the distance between the reel and the apparatus may be reduced.

The mounting of the guide means on the frame structure will save valuable deck space on the vessel and the guide means, the movement of which being centered on the vertical passage axis, will guide the elongated article down through the passage in a favourable centered manner.

Preferable embodiments of the invention are set out in the claims.

BRIEF DESCRIPTION OF THE DRAWINGS

The invention is described in greater detail hereinafter relative to a non-limitative embodiment and the attached drawings wherein show FIG. 1. a schematical elevational view of an apparatus according to the invention, FIG. 2. a schematical top view of the apparatus in FIG. 1, FIG. 3. a schematical horizontal section through the apparatus, FIG. 4 a schematical view of the apparatus onboard a vessel, and FIG. 5 a schematical view of a modified apparatus onboard a vessel.

DESCRIPTION OF THE PREFERRED EMBODIMENTS

Figure 1:
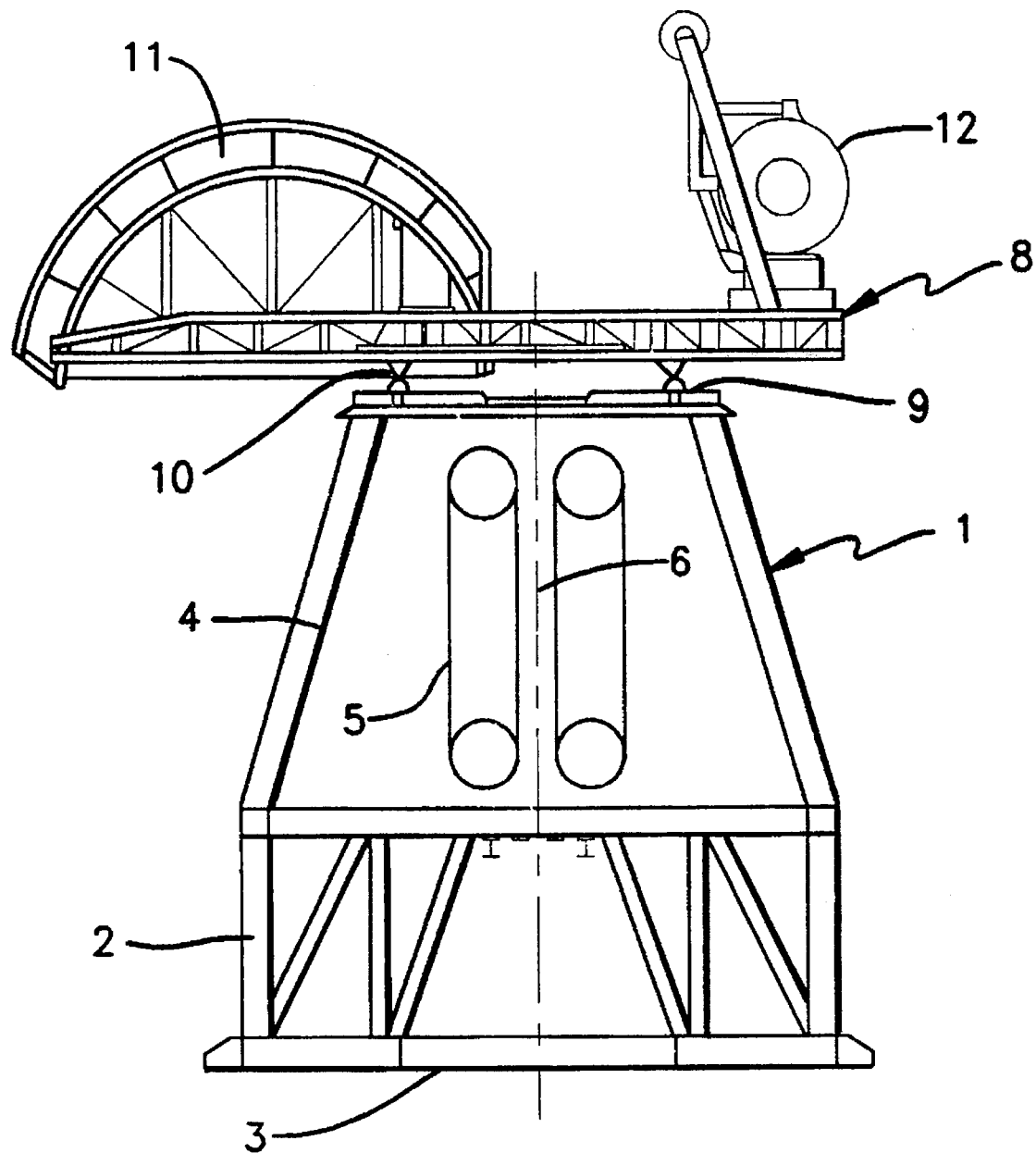
Figure 2:
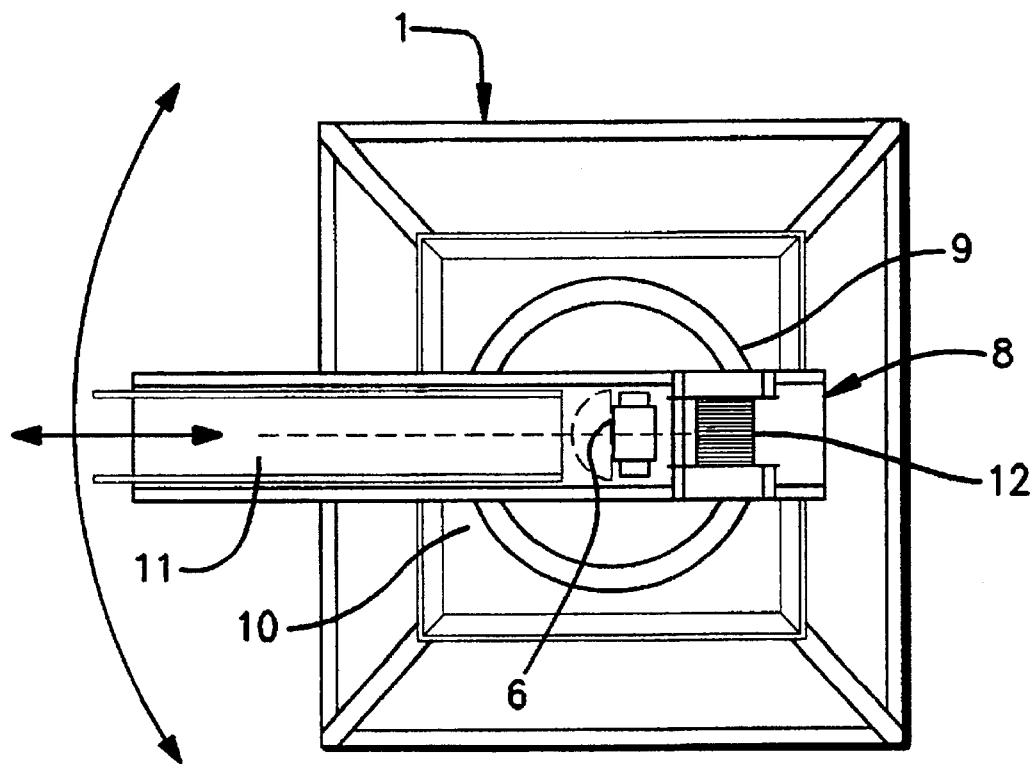
Figure 3:
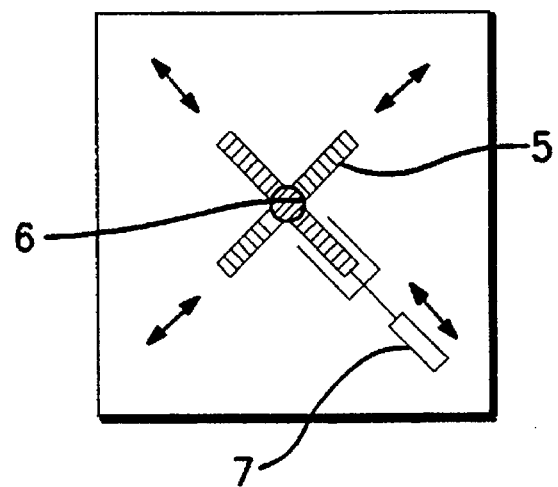

In FIGS. 1 and 2 discloses a frame structure 1. The frame structure has a lower part forming a working arch 2, in the bottom part of which there are two Moonpool doors 3. The frame structure has an upper part 4 wherein caterpillar tensioners 5 are arranged. As shown in FIG. 3 there are a total of fours caterpillar tensioners 5, each being moveable to and from a vertical centerline. In FIG. 3, the vertical centerline is represented by an elongated article, such as a cable 6 which is moved vertically down in the frame structure while engaged by the tensioners 5. The tensioner arrangement may be opened, that is each tensioner 5 may be moved radially outwards by means of a suitable drive means, here indicated by a piston-cylinder assembly 7.

The frame structure 1 includes a top side rotating assembly 8. This assembly 8 includes a circular rail 9 whereupon runs a carriage 10 which supports an arched guide means 11 as well as a winch 12. The carriage 10 may thus move in a circular path about a vertical axis 6, as indicated by the double arrows in FIG. 2.

Figure 4:
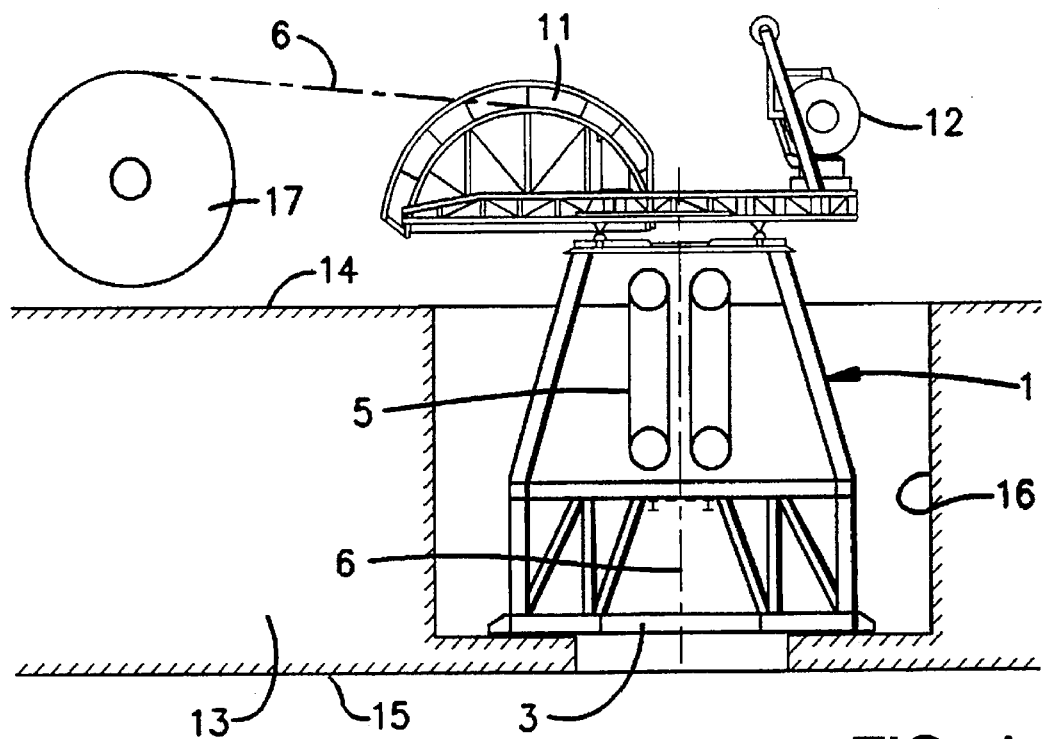

In FIG. 4 the apparatus hitherto described is placed onboard a vessel 13 having a deck 14, a bottom 15, and a vertical passage or moonpool 15. As shown, the frame structure 1 is mounted in the moonpool 15.

A reel 17 is supported on the vessel deck 14. This reel carries a length of a cable 6 wound thereon. When laid out, the cable 6 is, unwound from the reel 17 and is by means of the guide means 11, guided down into the frame structure 1 between the caterpillar tensioners 5. Thus, the cable 5 is laid down in the sea through the moonpool 18. The winch is used for temporarily holding the cable 5 if, and when for some reason, the caterpillar tensioner assembly is opened, for instance, if the cable 6 has an enlargement, such as a joint. The moonpool doors 3 are sliding door sections which may be moved to and from each other and may be used to centralize and support the cable 6.

Figure 5:
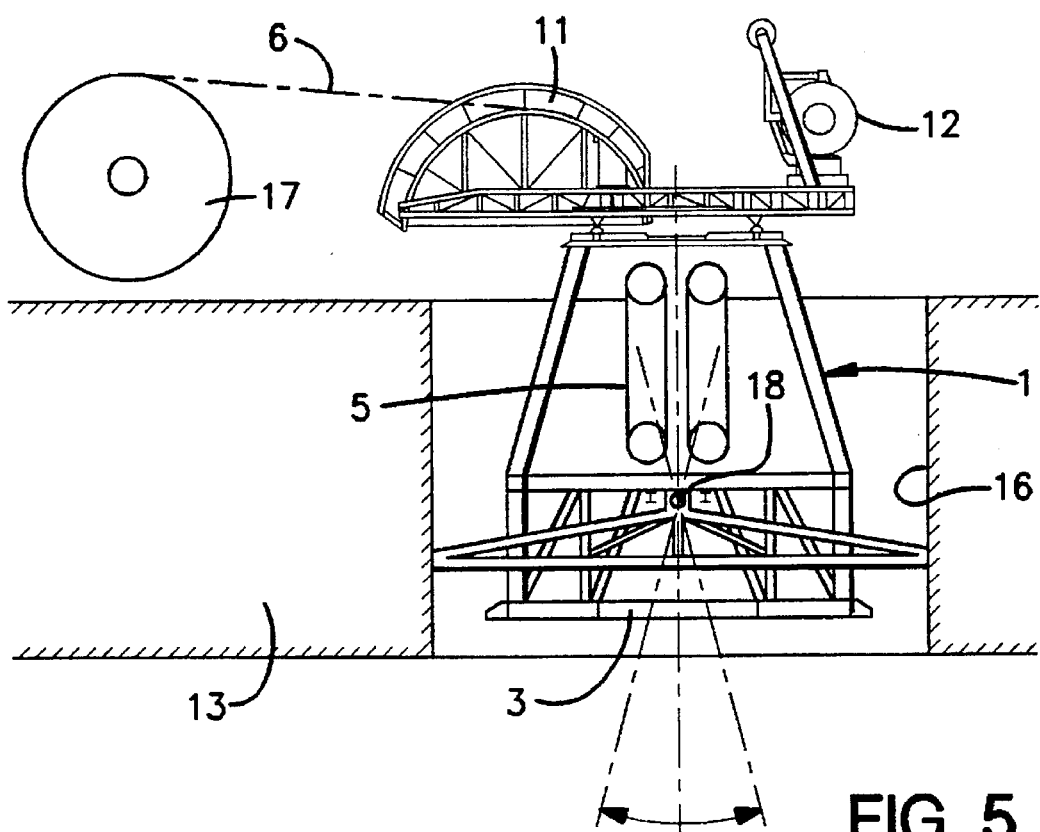

FIG. 5 discloses a modified version of the apparatus in FIG. 4. In the modified version the frame structure 1 is tiltable about a horizontal axis 18 in a framework 19 supported in the moonpool 15. The frame structure 1 may be adapted for pivotable movement in any direction by using a universal joint instead of the horizontal axis 18.

The apparatus may of course be reversed, that is, used for taking in a cable or the like and winding it on the reel.

Having described our invention, we claim:

1. An apparatus for use in laying an elongated flexible article, such as a cable or pipeline, from a vessel supported on a body of water, said apparatus comprising a reel rotatably mounted onboard the vessel, a vertical passage through the vessel at a distance from said reel, a frame structure supported above the vertical passage, guide means mounted rotatably on said frame structure about a vertical axis through said vertical passage and adapted to receive said elongated flexible article from said reel and guide said article downwards in the frame structure towards the vertical passage, tensioner means supported in said frame structure for applying tension in said elongated flexible article, and means for holding said article when said tensioner means are not applying tension in said elongated flexible article.

2. An apparatus according to claim 1, characterized in that said guiding means is mounted on a ring means on said frame structure.

3. An apparatus according to claim 2, characterized in that said frame structure has a top side, said ring means being arranged on said top side.

4. An apparatus according to claim 3, characterized in that said holding means is mounted on said ring means.

5. An apparatus according to claim 4, characterized in said holding means comprising a winch.

6. An apparatus according to claim 1, characterized in that said tensioner means comprises four caterpillar tensioner belts arranged equally spaced around said vertical axis.

7. An apparatus according to claim 1, characterized in that said frame structure is arranged tiltable about a horizontal axis.

8. An apparatus according to claim 1, characterized in that said frame structure is arranged for pivotable movement in any direction.

9. An apparatus according to claim 1, characterized in said frame structure including sliding door sections for moving to and from each other and in closed condition being adapted to centralize and support said elongated flexible article.

* * * * *